(12) United States Patent
Sodagar (10) Patent No.: US 11,930,254 B2
(45) Date of Patent: Mar. 12, 2024

(54) PATCHABLE REMOTE ELEMENT FOR DATA MANIPULATION

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 85 days.

(21) Appl. No.: 17/220,590

(22) Filed: Apr. 1, 2021

(65) Prior Publication Data

US 2021/0314674 A1 Oct. 7, 2021

Related U.S. Application Data

(60) Provisional application No. 63/042,282, filed on Jun. 22, 2020, provisional application No. 63/010,285, filed on Apr. 15, 2020, provisional application No. 63/009,150, filed on Apr. 13, 2020, provisional application No. 63/006,666, filed on Apr. 7, 2020.

(51) Int. Cl.
| | |
|---|---|
| *H04N 7/173* | (2011.01) |
| *H04L 65/65* | (2022.01) |
| *H04L 65/70* | (2022.01) |
| *H04L 65/75* | (2022.01) |
| *H04N 21/8543* | (2011.01) |

(52) U.S. Cl.
CPC ......... *H04N 21/8543* (2013.01); *H04L 65/65* (2022.05); *H04L 65/70* (2022.05); *H04L 65/75* (2022.05)

(58) Field of Classification Search
CPC .......... H04N 21/8543; H04N 7/147; H04N 21/2187; H04N 21/26258; H04L 65/65; H04L 65/70; H04L 65/75; H04L 65/612; H04L 65/403; H04L 67/02
See application file for complete search history.

(56) References Cited

U.S. PATENT DOCUMENTS

| | | |
|---|---|---|
| 10,771,824 B1 * | 9/2020 | Haritaoglu ......... H04N 21/6373 |
| 2002/0120752 A1 | 8/2002 | Logan et al. |
| 2011/0231660 A1 | 9/2011 | Kanungo |
| | | (Continued) |

FOREIGN PATENT DOCUMENTS

| | | |
|---|---|---|
| CN | 105379294 A | 3/2016 |
| JP | 2016-522621 A | 7/2016 |
| WO | 2015/009723 A1 | 1/2015 |

OTHER PUBLICATIONS

International Search Report dated Jul. 9, 2021 in International Application No. PCT/US2021/025584.

(Continued)

*Primary Examiner* — Annan Q Shang
(74) *Attorney, Agent, or Firm* — Sughrue Mion, PLLC (57) ABSTRACT

There is included a method and apparatus comprising computer code configured to cause a processor or processors to perform obtaining media content from a first content server, determining whether a manifest indicates presence of a remote element, resolving the remote element, manipulating an updated remote element, and streaming at least one of the media content from the first content server and another media content from a second content server based on manipulating the updated remote element.

20 Claims, 8 Drawing Sheets

(56) References Cited

U.S. PATENT DOCUMENTS

| | | | |
|---|---|---|---|
| 2014/0156865 A1* | 6/2014 | Giladi | H04L 65/612 709/231 |
| 2015/0019629 A1 | 1/2015 | Giladi et al. | |
| 2015/0269629 A1* | 9/2015 | Lo | H04L 65/65 705/14.66 |
| 2015/0350291 A1 | 12/2015 | Contreras Murillo et al. | |
| 2016/0127440 A1* | 5/2016 | Gordon | H04L 65/80 709/219 |
| 2016/0182593 A1* | 6/2016 | Denoual | H04N 21/2353 709/219 |
| 2016/0366198 A1* | 12/2016 | Jennings | H04L 12/2854 |
| 2017/0041372 A1* | 2/2017 | Hosur | H04N 21/85406 |
| 2017/0180077 A1* | 6/2017 | Kwak | H04L 1/0042 |
| 2017/0280181 A1* | 9/2017 | Ramaley | H04N 21/6373 |
| 2017/0353516 A1* | 12/2017 | Gordon | H04L 65/80 |
| 2019/0222622 A1* | 7/2019 | Jones | H04L 1/0018 |
| 2019/0364322 A1* | 11/2019 | Milford | H04N 21/26283 |
| 2019/0394537 A1* | 12/2019 | Chen | H04N 21/8456 |
| 2020/0275148 A1* | 8/2020 | Stockhammer | H04N 21/2668 |
| 2020/0322408 A1* | 10/2020 | Thang | H04L 65/756 |
| 2020/0358835 A1* | 11/2020 | Cenzano Ferret | H04L 65/765 |
| 2021/0065719 A1* | 3/2021 | Wang | G10L 17/02 |

OTHER PUBLICATIONS

Written Opinion of the International Searching Authority dated Jul. 9, 2021 in International Application No. PCT/US2021/025584.

Thomas Stockhammer, "Editor's Version of DASH is 4th Edition", Qualcomm Incorporated, 2020, ISO/IEC JTC1/SC29/WG11 MPEG2019/m52458, 287 pages.

J. Urpalainen, "An Extensible Markup Language (XML) Patch Operations Framework Utilizing XML Path Language (XPath) Selectors", Network Working Group, Request for Comments:5261, Category: Standards Track, Nokia, Sep. 2008, 40 pages, RFC 5261.

"Draft text of ISO/IEC 23009-1 4th edition DAM 1 CMAF support, events processing model and other extensions", Systems, 2020, ISO/IEC JTC 1/SC 29/WG 11 N19508, 48 pages.

Extended European Search Report dated Sep. 15, 2022 in Application No. 21785705.1.

Japanese Office action dated Jun. 5, 2023 in Japanese Application No. 2022-525436.

* cited by examiner

PATCHABLE REMOTE ELEMENT FOR DATA MANIPULATION

CROSS REFERENCE TO RELATED APPLICATION

The present application claims priority to provisional applications U.S. 63/006,666, filed on Apr. 7, 2020, U.S. 63/009,150, filed on Apr. 13, 2020, U.S. 63/010,285, filed on Apr. 15, 2020, and U.S. 63/042,282, filed on Jun. 22, 2020, the contents of which are hereby expressly incorporated by reference, in their entirety, into the present application.

BACKGROUND

1. Field

The present disclosure is directed live streaming multiple media content from multiple servers including manipulation of a resolved element addressing media streaming use-cases.

2. Description of Related Art

In Moving Picture Experts Group (MPEG) Dynamic Adaptive Streaming over HTTP (DASH), during the playback of the content, elements of a Media Presentation Description (MPD) must be resolved before building the timeline, and after said resolution, a default element may be entirely replaced with the resolved element, yet no information may be left from the original content.

As such, there are technical problems in the art regarding target-based content tailoring, a popular and important feature, in streaming. These features allow each client to play different content depending on the viewer's preferences, location, age, interest, and other factors. Target-based content, such as advertising, is an important use-case in this regard. The client-side target-based content tailoring may have been achieved by remote elements in DASH and other streaming protocols. Attempts at such content tailoring may disadvantageously result in resolution of updates wherein any child of a default element is lost and as such, when the default element was describing main content, when the client plays a remote period, a connection to a live server may be lost.

SUMMARY

To address one or more different technical problems, this disclosure provides technical solutions to reduce network overhead and server computational overheads while delivering an option to apply various operations to the resolved element such that in using these operations some of the properties like the connection to the live server may be maintained for example.

There is included a method and apparatus comprising memory configured to store computer program code and a processor or processors configured to access the computer program code and operate as instructed by the computer program code. The computer program code includes obtaining code configured to cause the at least one processor to obtain media content from a first content server, determining code configured to cause the at least one processor to determine whether a manifest, included with the media content from the first server, indicates presence of a remote element, resolving code configured to cause the at least one processor to resolve, in response to determining that the manifest indicates presence of the remote element, the remote element by updating a default remote element, included with the manifest, to an updated remote element, manipulating code configured to cause the at least one processor to manipulate the updated remote element after the default remote element is resolved, to the resolved remote element, based on a signaling by a document stored in a remote location, and streaming code configured to cause the at least one processor to stream at least one of the media content from the first content server and an other media content from a second content server based on manipulating the updated remote element, such that said signaling signals retrieving of a plurality of instructions, after the remote element is resolved, and applying the retrieved instructions to the resolved remote element.

According to exemplary embodiments, manipulating the updated remote element comprises obtaining an extensible markup language (XML) patch from the document.

According to exemplary embodiments, in a case in which the other media content from the second content server is streamed, a connection to the first server is maintained by a client device while the client device is streaming the another media content.

According to exemplary embodiments, the computer program code further includes determining code configured to cause the at least one processor to determine, in the case in which the other media content from the second content server is streamed, whether to terminate the streaming of the other media content before a termination time indicated in the updated remote element.

According to exemplary embodiments, the computer program code further includes, terminating code configured to cause the at least one processor to terminate the streaming of the other media content, before the termination time indicated in the updated remote element, based on an update from the first content server to the client device while the client device is streaming the other media content.

According to exemplary embodiments, manipulating the updated remote element comprises manipulating a Media Presentation Description (MPD) provided by the first content server.

According to exemplary embodiments, streaming the at least one of the media content from the first content server and the other media content from the second content server based on manipulating the updated remote element comprises Dynamic Adaptive Streaming over HTTP (DASH) streaming.

According to exemplary embodiments, resolving the remote element comprises accessing a plurality of links included in the MPD.

According to exemplary embodiments, a first link of the links is to the resolved remote element to replace the default remote element included in the MPD, and a second link of the links is to a patch comprising instructions to manipulate the resolved report element.

BRIEF DESCRIPTION OF THE DRAWINGS

Further features, nature, and various advantages of the disclosed subject matter will be more apparent from the following detailed description and the accompanying drawings in which.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
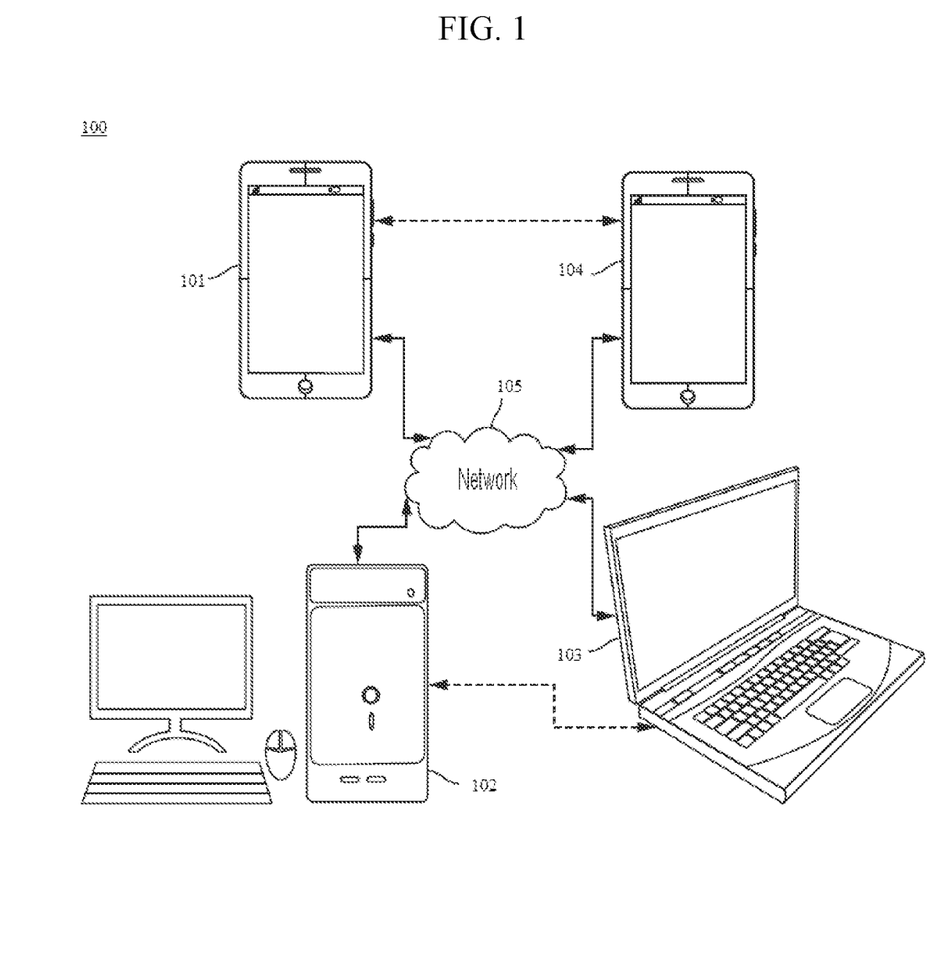
FIG. 1 is a simplified schematic illustration in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
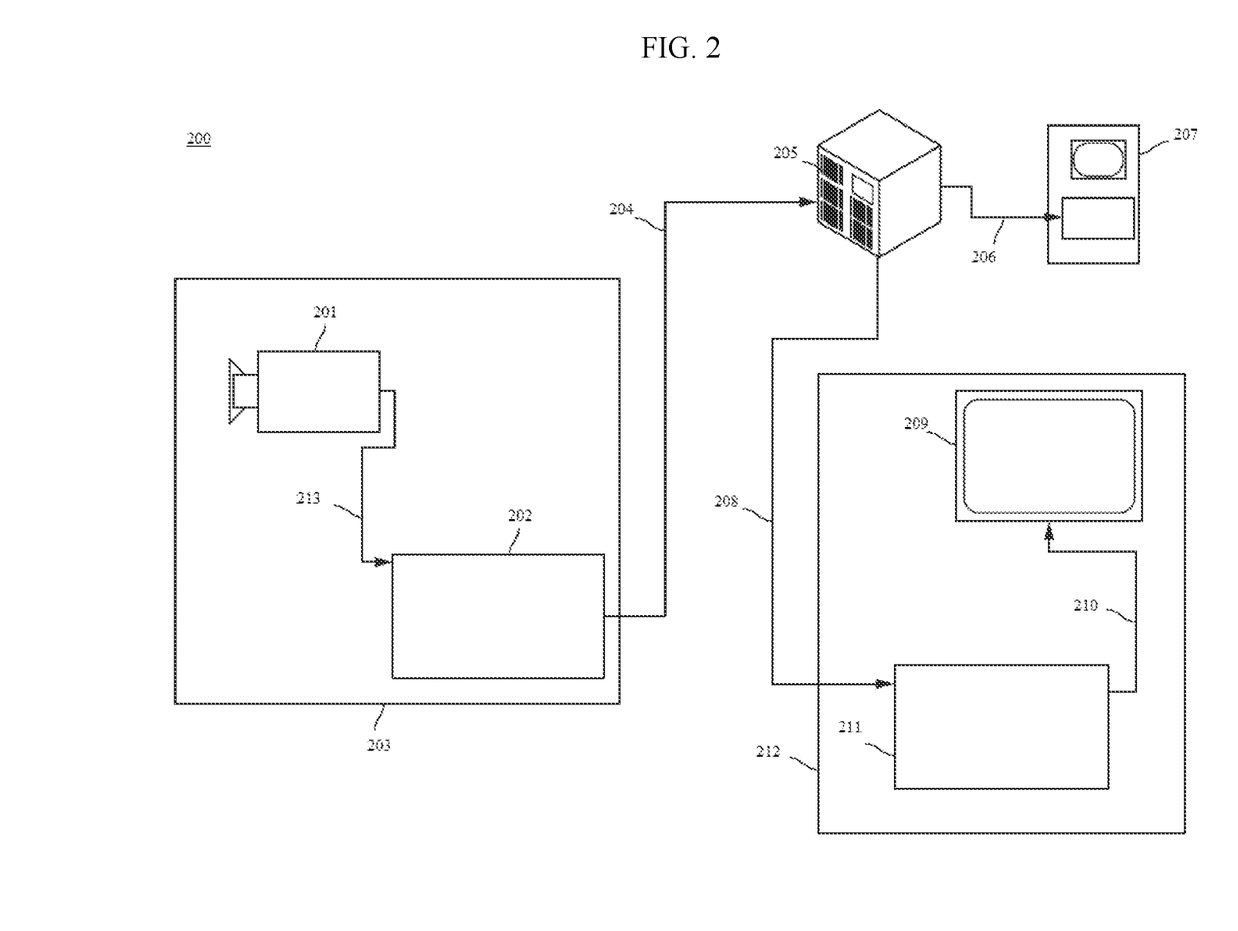
FIG. 2 is a simplified schematic illustration in accordance with embodiments.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the camera 201. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

Figure 3:
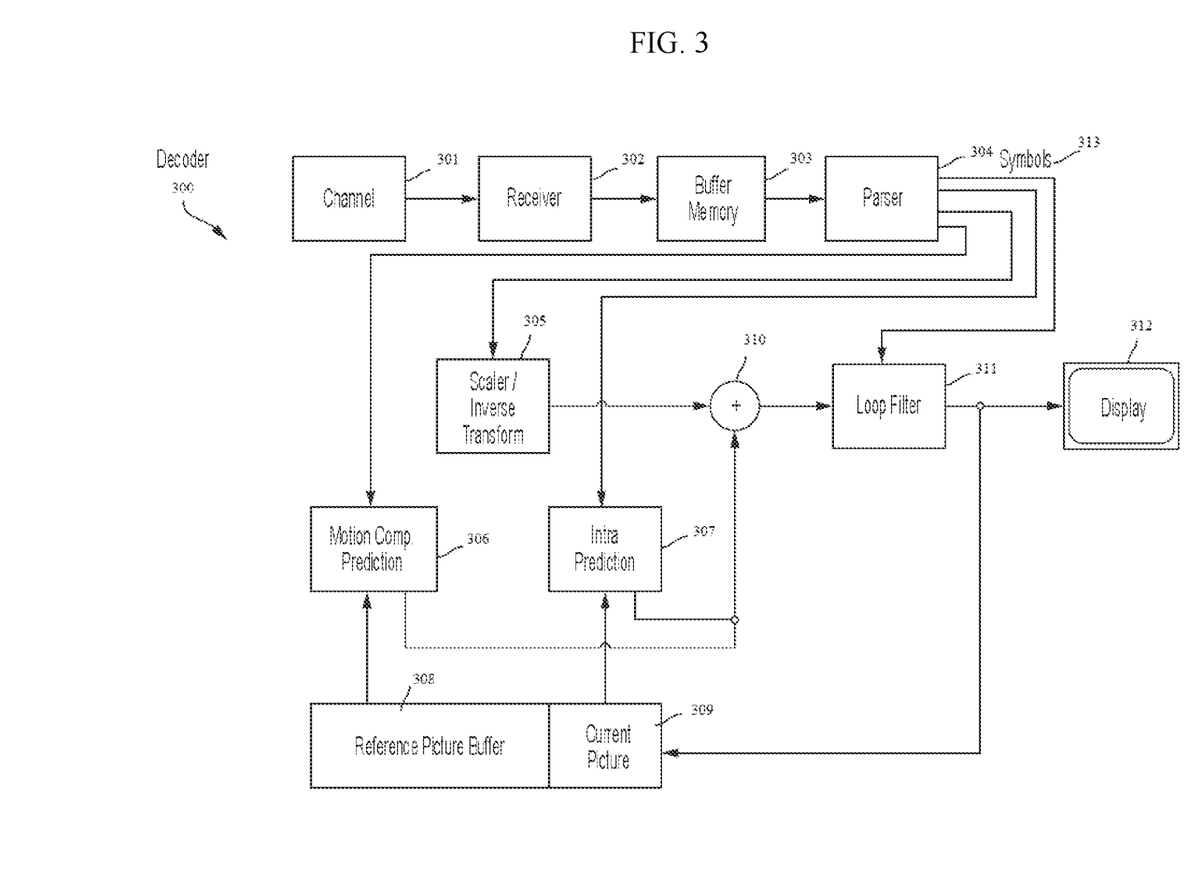
FIG. 3 is a simplified block diagram regarding decoders in accordance with embodiments.

FIG. 3 may be a functional block diagram of a video decoder 300 according to an embodiment of the present invention.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities (not depicted). The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosychronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information parameter set fragments (not depicted). The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 300 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the render device 312 as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 4:
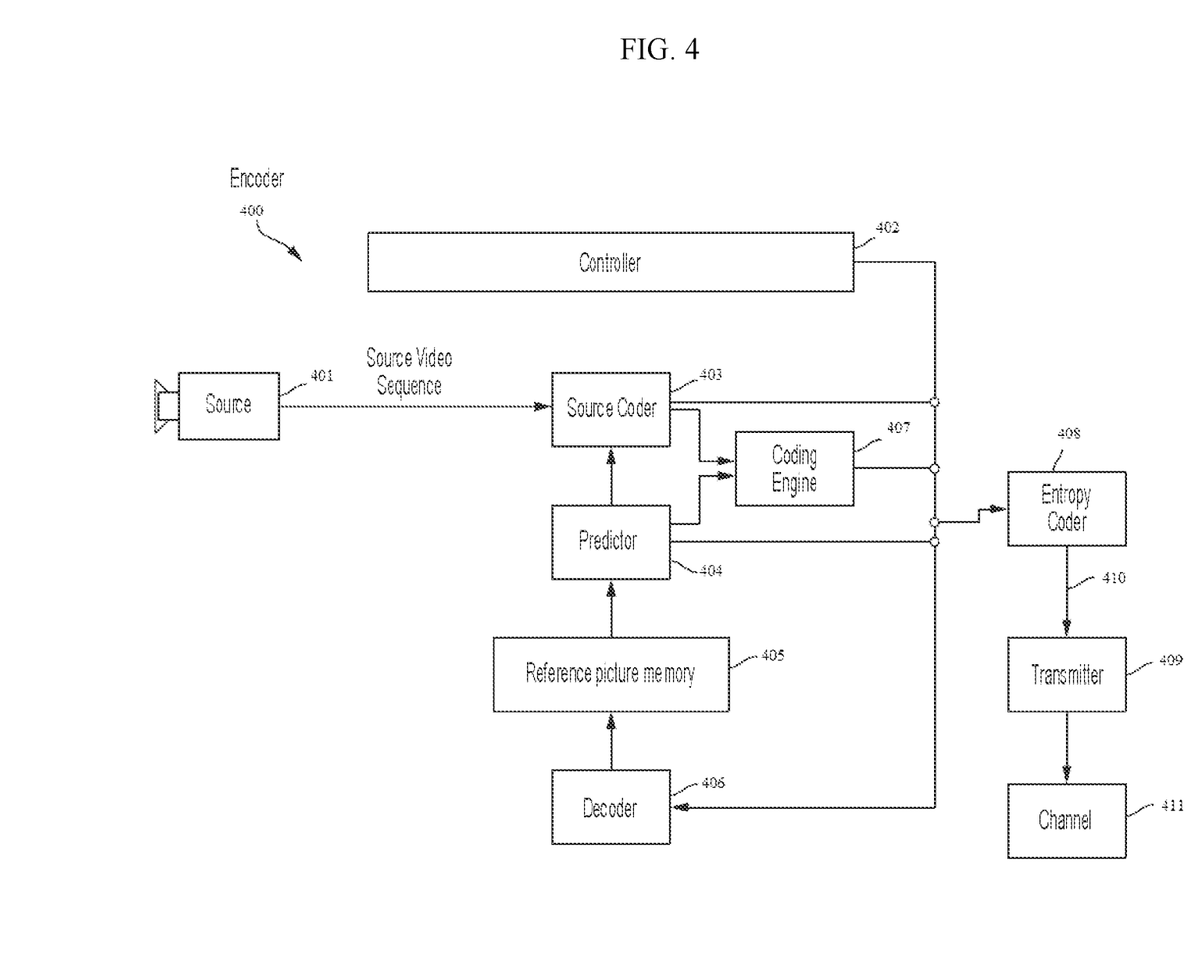
FIG. 4 is a simplified block diagram regarding encoders in accordance with embodiments.

FIG. 4 may be a functional block diagram of a video encoder 400 according to an embodiment of the present disclosure.

The encoder 400 may receive video samples from a video source 401 (that is not part of the encoder) that may capture video image(s) to be coded by the encoder 400.

The video source 401 may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 401 may be a storage device storing previously prepared video. In a videoconferencing system, the video source 401 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 400 may code and compress the pictures of the source video sequence into a coded video sequence 410 in real time or under any other time constraints as required by the application. Enforcing appropriate coding speed is one function of Controller 402. Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 402 as they may pertain to video encoder 400 optimized for a certain system design.

Some video encoders operate in what a person skilled in the art readily recognizes as a "coding loop." As an oversimplified description, a coding loop can consist of the encoding part of an encoder 402 ("source coder" henceforth) (responsible for creating symbols based on an input picture to be coded, and a reference picture(s)), and a (local) decoder 406 embedded in the encoder 400 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 405. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 406 can be the same as of a "remote" decoder 300, which has already been described in detail above in conjunction with FIG. 3. Briefly referring also to FIG. 4, however, as symbols are available and en/decoding of symbols to a coded video sequence by entropy coder 408 and parser 304 can be lossless, the entropy decoding parts of decoder 300, including channel 301, receiver 302, buffer 303, and parser 304 may not be fully implemented in local decoder 406.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 403 may perform motion compensated predictive coding, which codes an input frame predictively with reference to one or more previously-coded frames from the video sequence that were designated as "reference frames." In this manner, the coding engine 407 codes differences between pixel blocks of an input frame and pixel blocks of reference frame(s) that may be selected as prediction reference(s) to the input frame.

The local video decoder 406 may decode coded video data of frames that may be designated as reference frames, based on symbols created by the source coder 403. Operations of the coding engine 407 may advantageously be lossy processes. When the coded video data may be decoded at a video decoder (not shown in FIG. 4), the reconstructed video sequence typically may be a replica of the source video sequence with some errors. The local video decoder 406 replicates decoding processes that may be performed by the video decoder on reference frames and may cause reconstructed reference frames to be stored in the reference picture cache 405. In this manner, the encoder 400 may store copies of reconstructed reference frames locally that have common content as the reconstructed reference frames that will be obtained by a far-end video decoder (absent transmission errors).

The predictor 404 may perform prediction searches for the coding engine 407. That is, for a new frame to be coded, the predictor 404 may search the reference picture memory 405 for sample data (as candidate reference pixel blocks) or certain metadata such as reference picture motion vectors, block shapes, and so on, that may serve as an appropriate prediction reference for the new pictures. The predictor 404 may operate on a sample block-by-pixel block basis to find appropriate prediction references. In some cases, as determined by search results obtained by the predictor 404, an input picture may have prediction references drawn from multiple reference pictures stored in the reference picture memory 405.

The controller 402 may manage coding operations of the video coder 403, including, for example, setting of parameters and subgroup parameters used for encoding the video data.

Output of all aforementioned functional units may be subjected to entropy coding in the entropy coder 408. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 409 may buffer the coded video sequence (s) as created by the entropy coder 408 to prepare it for transmission via a communication channel 411, which may be a hardware/software link to a storage device which would store the encoded video data. The transmitter 409 may merge coded video data from the video coder 403 with other data to be transmitted, for example, coded audio data and/or ancillary data streams (sources not shown).

The controller 402 may manage operation of the encoder 400. During coding, the controller 405 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 400 may perform coding operations according to a predetermined video coding technology or standard, such as ITU-T Rec. H.265. In its operation, the video coder 400 may perform various compression operations, including predictive coding operations that exploit temporal and spatial redundancies in the input video sequence. The coded video data, therefore, may conform to a syntax specified by the video coding technology or standard being used.

In an embodiment, the transmitter 409 may transmit additional data with the encoded video. The source coder 403 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 5:
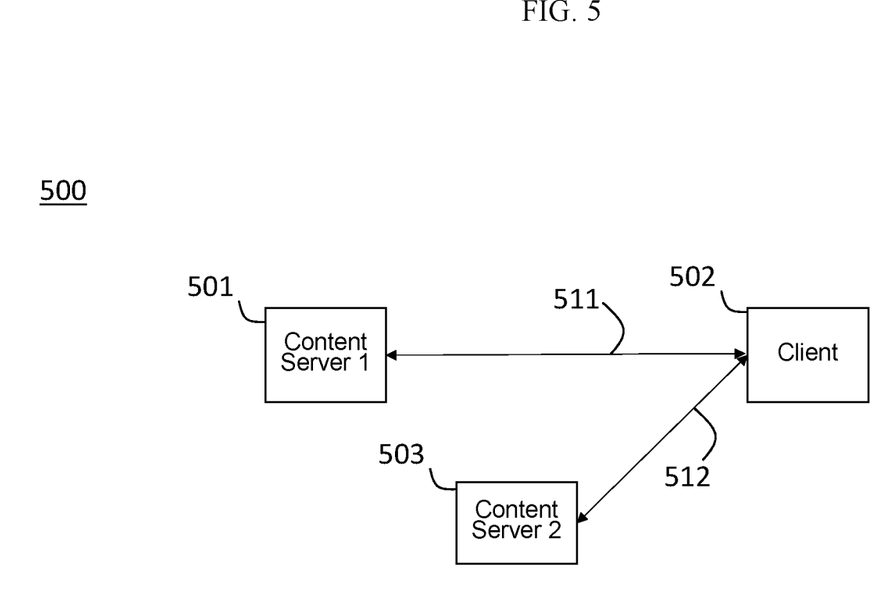
FIG. 5 is a simplified block diagram in accordance with embodiments.

FIG. 5 illustrates a simplified block diagram 500 according to exemplary embodiments in which there is illustrated a first content server 501, a client 502, such as a terminal or the like, and a second content server 503. According to exemplary embodiments, the first content server 501 may be separate from the second content server 503, and the first content server 501 may provide content 511 to the client 502, and the second content server 503 may provide an advertisement 512 to the client 502 between parts of the content 511.

For example, the first content server 501 may provide the client 502 with a manifest for playing back the content 511, and to provide such content including various one or more target-based content, the manifest may include periods (e.g., P1, P2, and P3); considering periods P1 and P3 as explicit periods, according to the manifest, in which content 511 residing in first content server 501, then the period P2 may be a remote period, such that the manifest provided for content 511 to the client 502 may include a default period pointing to the first content server 501 and Xlink elements pointing to the second content server 503

According to exemplary embodiments, when the client 502 parses such manifest for the content 511, the client 502 may need to resolve said period P2, and as the period P2 may be represented in the manifest as an Xlink pointing to the second content server 503, the client 502 may attempt to resolve the period P2 according to said Xlink by requesting it from the second content server 502 and then, when retrieved from the second content server 502, replaces the default period P2, from the manifest from content server 501, with a resolved period P2 (which may be referred to as a period P2'), and then streams period P2' content, such as advertisement content 512 from the second content server 503 according to the resolved manifest and updated periods as is further described herein according to exemplary embodiments.

Figure 6:
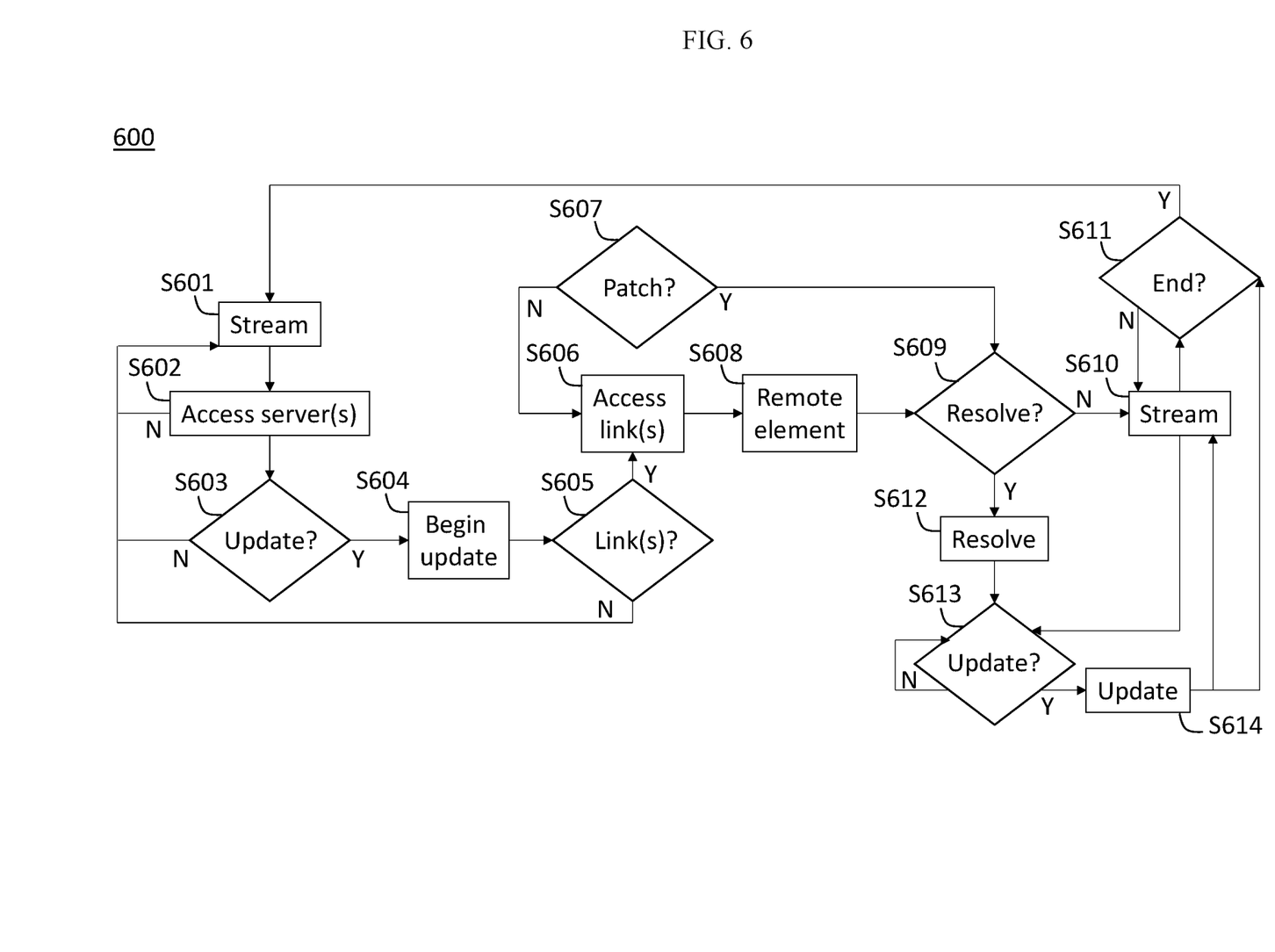
FIG. 6 is a simplified flow chart in accordance with embodiments.

FIG. 6 illustrates a simplified flow chart 600 according to exemplary embodiments.

For example, at S601, the client 502 and first content server 501 may attempt to initiate streaming content to the client 502. Accordingly, based on a manifest sent from the first content server 501 to the client 502 involving such content, the client 502 may attempt to access one or more of the first content server 501 and second content server 503 based on said manifest data such as including initial media presentation description (MPD) published with a period P1 and including an MPD event stream for an MPD update according to exemplary embodiments. Either initially with the streaming at S601 or later, it may be determined at S603 that an ad-advert is inserted such that the MPD is to be updated, at S604-S614, to have three periods (e.g., periods P1, P2, and P3) and that all periods represent live content and such that all periods contain the MPD event stream for the MPD update. According to exemplary embodiments, the period P2 may be indicated, as determined at S605 and accessed at S606, as having an Xlink URL, accessed at S608, as well as an @patchURL, determined and accessed at S607, attribute pointing to a patch element which may contain an additional element to add, as determined by presence or absence of said patch at S608 and if so added at S612, to a remote EventStream element to the period P2.

As such, when the client 502 resolves, at S608, S609, and S612, an Xlink URL for the period P2, the client 502 may then receive the updated period P2', and similarly, when the client 502 resolves, at S607, S609, and S612, the client 502 may then resolve said @patchUrl which, according to exemplary embodiments, has one or more instructions to add a remote EventStream element to P2' in place of the default P2 noted above with respect to S601 and S602.

Further, when streaming at S610, while the client 502 is playing an advertisement at the updated period P2', the client may also receive an EventStream, as determined at S613, carrying one or more MPD update events, and accordingly, when such update is recognized at S613 and from any of S612 and S610, the client 502 then updates the MPD with a new P2" and a correspondingly new P3' based on the new period P2" which may be longer or shorter than any of the previous periods P2 and P2'. For example, in the cause that said update at S613 indicates that the update at S614 is to end the playing of an advertisement from the second content server 503 and return to the content from the first content server 501, then at S611 it may be determined to end, and if not, then the advertisement stream S610 may continue based on the updated MPD information.

Such features advantageous allow the client 502 to maintain a connection with the first content server 501, even when playing from the second content server 502, because of the remote MPD EventStream element added to the period after said Xlink resolution, and according to exemplary embodiments, an adaptation Set can be added that contains inband events for such purpose. For example, if at S601, the process were to proceed such that the MPD may be published with a period P1, and then at some point, an ad-advert may be inserted such that the MPD is updated to have three periods (e.g. P1, P2, and P3) that all represent live content but such that P2 also has an Xlink to an ad-server, such as second content server 503, then in an early termination case, at S613 to S614, to S611, to S601, while the client 502 is playing the advertisement in period P2, the MPD may be updated with the new P2 (P2') which is of a shortened duration as compared to P2 (such that the MPD then has three periods P1, P2', and P3) where the new updated version of P3, P3', has a start time that is earlier than P3, then in such exemplary scenarios, during playback of the advertisement, the client 502 may be connected to the advertisement server, second content server 503, but since the client 502 is then not streaming any media from the first content server 501, in contrast to other exemplary embodiments in FIG. 7, 5h3 client 502 may not receive any inband events such that, since P2' is replaced by a period provided by the second content server 503 (i.e., a new P2"), the client may not receive any MPD events during P2", and thus, the client disadvantageously must instead frequently attempt to pull MPD, such as any MPD updates, from the first content server 501. Such disadvantageous technical problems are accordingly solved by such exemplary embodiments described with respect to the exemplary flowchart 600 herein.

Figure 7:
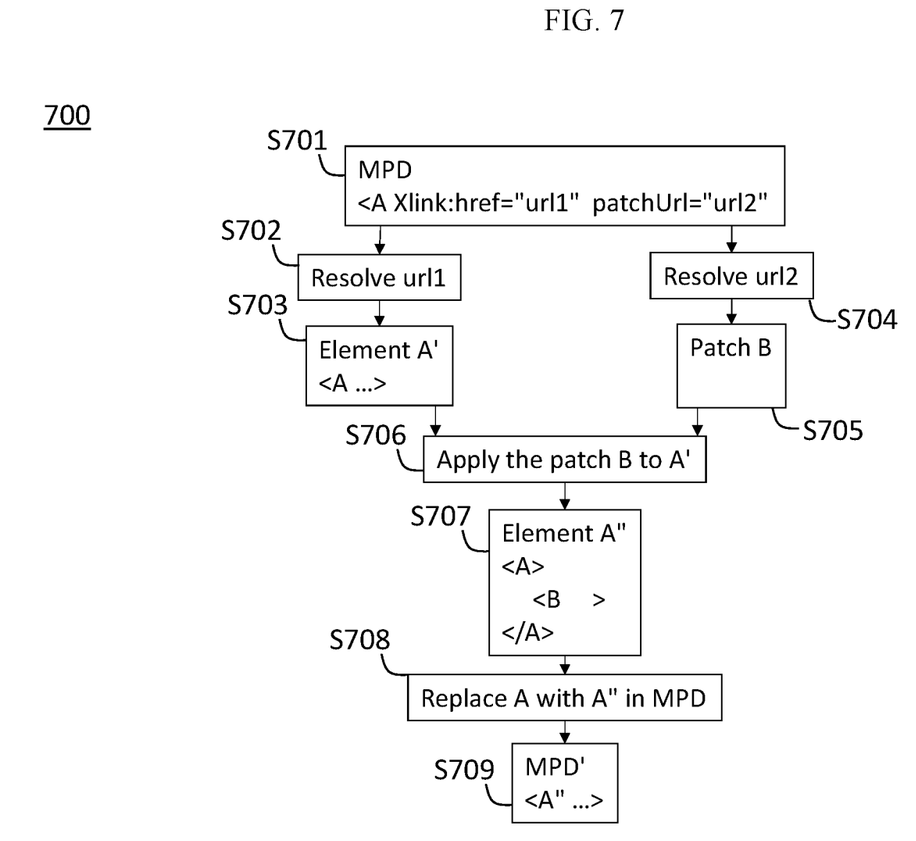
FIG. 7 is a simplified flow chart in accordance with embodiments.

FIG. 7 illustrates a flowchart 700 according to exemplary embodiments with respect to the updates and resolutions discussed above with respect to the flowchart 600. For example, as shown in flowchart 700, an MPD, having an Xlink and a patchURL as described above, may be received by the client 502 at S701. Accordingly, based on that MPD from S701, the client may response the url1 from the Xlink at S702 such that an element A', a remote element for example instructing the client 502 to access the second content server 503, may be added, at S703, in place of a default information of a manifest provided to the client 502. Additionally, in series or in parallel, the client 502 may also resolve, at S704, a url2 indicated from the patchURL, so as to, at S705, obtain a Patch, and at S706, apply the patch to the element A'; where such application, according to exemplary embodiments, may be according to an XML patch process resulting in element A". Accordingly, at S707, the remote element A", as patched, includes various XML information as suggested in FIG. 7. Then, at S708, the default A in the MPD provided to the client 502 may be replaced with the updated, patched remote element A" in the MPD such that, at S709, the MPD may be processed based on this new remote element A".

Accordingly, viewing such features of FIG. 6 and FIG. 7 for example, embodiments improve over the herein described technical disadvantages by allowing for manipulation of a remote element after it is resolved such that, therefore, the replacement of said element may not remove the previously updated information entirely, and by maintaining at least some properties offered by a main server, such as first content server 501, while the element is replaced by another server, such as second content server 503, and exemplary embodiments may achieve such advantageous, technological effects with respect to use of XML, XLINK, and XML patch features and may be able to add, remove, and replace one or more elements therein accordingly. Additionally, storage of such instructions is advantageously implemented in a separate document which cn be modified or updated independently of the initially provided or prepared manifest noted above, and also a possibility of maintaining a connection to a live server, such as first content server 501, during streaming from an ad-server, such as second content server 503, may occur even by maintaining media steam(s) from such live server along with additional technical advantages of customizing said patch(es) instruction(s) per client(s).

The techniques described above, can be implemented as computer software using computer-readable instructions and physically stored in one or more computer-readable media or by a specifically configured one or more hardware processors. For example, FIG. 8 shows a computer system 800 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 8:
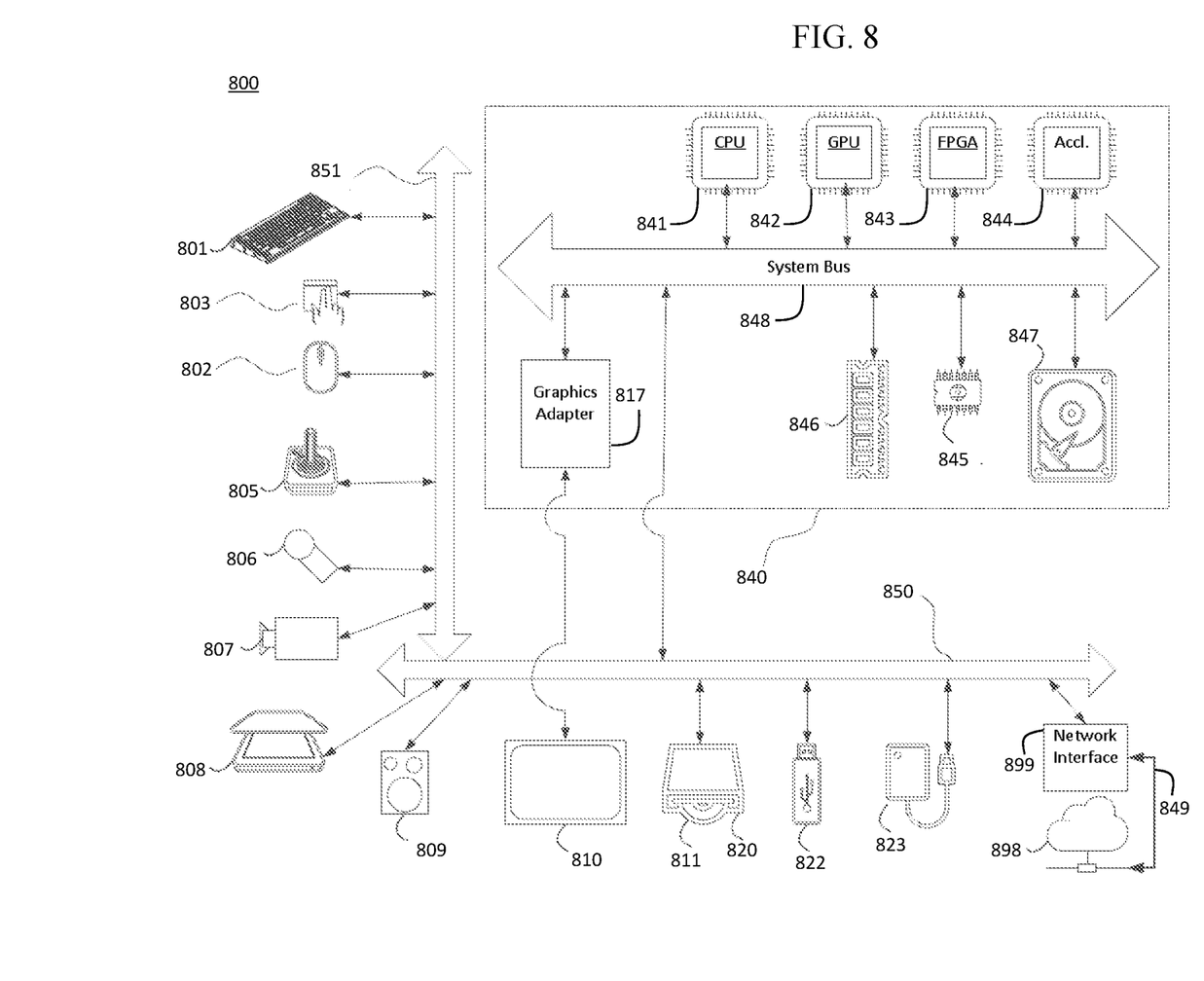
FIG. 8 is a schematic illustration in accordance with embodiments.

The components shown in FIG. 8 for computer system 800 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 800.

Computer system 800 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 801, mouse 802, trackpad 803, touch screen 810, joystick 805, microphone 806, scanner 808, camera 807.

Computer system 800 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 810, or joystick 805, but there can also be tactile feedback devices that do not serve as input devices), audio output devices (such as: speakers 809, headphones (not depicted)), visual output devices (such as screens 810 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 800 can also include human accessible storage devices and their associated media such as optical media including CD/DVD ROM/RW 820 with CD/DVD 811 or the like media, thumb-drive 822, removable hard drive or solid state drive 823, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 800 can also include interface 899 to one or more communication networks 898. Networks 898 can for example be wireless, wireline, optical. Networks 898 can further be local, wide-area, metropolitan, vehicular and industrial, real-time, delay-tolerant, and so on. Examples of networks 998 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 898 commonly require external network interface adapters that attached to certain general-purpose data ports or peripheral buses (850 and 851) (such as, for example USB ports of the computer system 800; others are commonly integrated into the core of the computer system 800 by attachment to a system bus as described below (for example Ethernet interface into a PC computer system or cellular network interface into a smartphone computer system). Using any of these networks 898, computer system 800 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 840 of the computer system 800.

The core 840 can include one or more Central Processing Units (CPU) 841, Graphics Processing Units (GPU) 842, a graphics adapter 817, specialized programmable processing units in the form of Field Programmable Gate Areas (FPGA) 843, hardware accelerators for certain tasks 844, and so forth. These devices, along with Read-only memory (ROM) 845, Random-access memory 846, internal mass storage such as internal non-user accessible hard drives, SSDs, and the like 847, may be connected through a system bus 848. In some computer systems, the system bus 848 can be accessible in the form of one or more physical plugs to enable extensions by additional CPUs, GPU, and the like. The peripheral devices can be attached either directly to the core's system bus 848, or through a peripheral bus 851. Architectures for a peripheral bus include PCI, USB, and the like.

CPUs 841, GPUs 842, FPGAs 843, and accelerators 844 can execute certain instructions that, in combination, can make up the aforementioned computer code. That computer code can be stored in ROM 845 or RAM 846. Transitional data can be also be stored in RAM 846, whereas permanent data can be stored for example, in the internal mass storage 847. Fast storage and retrieval to any of the memory devices can be enabled through the use of cache memory, that can be closely associated with one or more CPU 841, GPU 842, mass storage 847, ROM 845, RAM 846, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 800, and specifically the core 840 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 840 that are of non-transitory nature, such as core-internal mass storage 847 or ROM 845. The software implementing various embodiments of the present disclosure can be stored in such devices and executed by core 840. A computer-readable medium can include one or more memory devices or chips, according to particular needs. The software can cause the core 840 and specifically the processors therein (including CPU, GPU, FPGA, and the like) to execute particular processes or particular parts of particular processes described herein, including defining data structures stored in RAM 846 and modifying such data structures according to the processes defined by the software. In addition or as an alternative, the computer system can provide functionality as a result of logic hardwired or otherwise embodied in a circuit (for example: accelerator 844), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for streaming media content, the method performed by at least one processor and comprising:
obtaining media content from a first content server based on determining to stream the media content from the first content server to a client device;

determining whether a manifest, included with the media content from the first server, indicates presence of a remote element;
resolving, in response to determining that the manifest indicates presence of the remote element, the remote element by updating a default remote element, included with the manifest, to an updated remote element signaling both to stream, to the client device, another media content from a second content server and to check, by the client device, for an event stream update indicating to resume a stream to the client device and from the first server while the other media content is streamed, to the client device, from the second content server, wherein resolving the remote element comprises resolving, in parallel, both an Xlink URL and an @patchURL, wherein the Xlink URL is a different URL than that of the @patchURL, and wherein resolving the Xlink URL comprises determining an updated time period as compared to a time period indicated in the manifest, and wherein resolving the @patchURL comprises determining to add the remote EventStream element to the updated remote element while the client device maintains a connection to the first content server;
manipulating, while the other media content is streamed, to the client device and from the second content server, the updated remote element after the default remote element is resolved, to the resolved remote element, based on a signaling by a document, of the event stream update, stored in a remote location; and
streaming, to the client device, at least one of the media content from the first content server and the other media content from the second content server based on manipulating the updated remote element,
wherein said signaling signals retrieving of a plurality of instructions, after the remote element is resolved, and applying the retrieved instructions to the resolved remote element.

2. The method according to claim 1,
wherein manipulating the updated remote element comprises obtaining an extensible markup language (XML) patch from the document.

3. The method according to claim 1,
wherein, in a case in which the other media content from the second content server is streamed, a connection to the first server is maintained by the client device while the client device is streaming the another media content.

4. The method according to claim 3, further comprising:
determining, in the case in which the other media content from the second content server is streamed, whether to terminate the streaming of the other media content before a termination time indicated in the updated remote element.

5. The method according to claim 4, further comprising:
terminating the streaming of the other media content, before the termination time indicated in the updated remote element, based on an update from the first content server to the client device while the client device is streaming the other media content.

6. The method according to claim 1,
wherein manipulating the updated remote element comprises manipulating a Media Presentation Description (MPD) provided by the first content server.

7. The method according to claim 6,
wherein streaming the at least one of the media content from the first content server and the other media content from the second content server based on manipulating the updated remote element comprises Dynamic Adaptive Streaming over HTTP (DASH) streaming.

8. The method according to claim 6,
wherein resolving the remote element comprises accessing a plurality of links included in the MPD.

9. The method according to claim 8,
wherein a first link of the links is to the resolved remote element to replace the default remote element included in the MPD.

10. The method according to claim 9,
wherein a second link of the links is to a patch comprising instructions to manipulate the resolved report element.

11. An apparatus for video signaling, the apparatus comprising:
at least one memory configured to store computer program code;
at least one processor configured to access the computer program code and operate as instructed by the computer program code, the computer program code including:
obtaining code configured to cause the at least one processor to obtain media content from a first content server based on determining to stream the media content from the first content server to a client device;
determining code configured to cause the at least one processor to determine whether a manifest, included with the media content from the first server, indicates presence of a remote element;
resolving code configured to cause the at least one processor to resolve, in response to determining that the manifest indicates presence of the remote element, the remote element by updating a default remote element, included with the manifest, to an updated remote element signaling both to stream, to the client device, another media content from a second content server and to check, by the client device, for an event stream update indicating to resume a stream to the client device and from the first server while the other media content is streamed, to the client device, from the second content server, wherein resolving the remote element comprises resolving, in parallel, both an Xlink URL and an @patchURL, wherein the Xlink URL is a different URL than that of the @patchURL, and wherein resolving the Xlink URL comprises determining an updated time period as compared to a time period indicated in the manifest, and wherein resolving the @patchURL comprises determining to add the remote EventStream element to the updated remote element while the client device maintains a connection to the first content server;
manipulating, while the other media content is streamed, to the client device and from the second content server, code configured to cause the at least one processor to manipulate the updated remote element after the default remote element is resolved, to the resolved remote element, based on a signaling by a document, of the event stream update, stored in a remote location; and
streaming code configured to cause the at least one processor to stream, to the client device, at least one of the media content from the first content server and the other media content from the second content server based on manipulating the updated remote element, wherein said signaling signals retrieving of a plurality of instructions, after the remote element is resolved, and applying the retrieved instructions to the resolved remote element.

12. The apparatus according to claim 11, wherein manipulating the updated remote element comprises obtaining an extensible markup language (XML) patch from the document.

13. The apparatus according to claim 11, wherein, in a case in which the other media content from the second content server is streamed, a connection to the first server is maintained by the client device while the client device is streaming the another media content.

14. The apparatus according to claim 13, the computer program code further includes:

determining code configured to cause the at least one processor to determine, in the case in which the other media content from the second content server is streamed, whether to terminate the streaming of the other media content before a termination time indicated in the updated remote element.

15. The apparatus according to claim 14, the computer program code further includes:

terminating code configured to cause the at least one processor to terminate the streaming of the other media content, before the termination time indicated in the updated remote element, based on an update from the first content server to the client device while the client device is streaming the other media content.

16. The apparatus according to claim 11, wherein manipulating the updated remote element comprises manipulating a Media Presentation Description (MPD) provided by the first content server.

17. The apparatus according to claim 16, wherein streaming the at least one of the media content from the first content server and the other media content from the second content server based on manipulating the updated remote element comprises Dynamic Adaptive Streaming over HTTP (DASH) streaming.

18. The apparatus according to claim 16, wherein resolving the remote element comprises accessing a plurality of links included in the MPD.

19. The apparatus according to claim 18, wherein a first link of the links is to the resolved remote element to replace the default remote element included in the MPD, and wherein a second link of the links is to a patch comprising instructions to manipulate the resolved report element.

20. A non-transitory computer readable medium storing a program causing a computer to execute a process, the process comprising:

obtaining media content from a first content server based on determining to stream the media content from the content server to a client device;

determining whether a manifest, included with the media content from the first server, indicates presence of a remote element;

resolving, in response to determining that the manifest indicates presence of the remote element, the remote element by updating a default remote element, included with the manifest, to an updated remote element signaling both to stream, to the client device, another media content from a second content server and to check, by the client device, for an event stream update indicating to resume a stream to the client device and from the first server while the other media content is streamed, to the client device, from the second content server, wherein resolving the remote element comprises resolving, in parallel, both an Xlink URL and an @patchURL, wherein the Xlink URL is a different URL than that of the @patchURL, and wherein resolving the Xlink URL comprises determining an updated time period as compared to a time period indicated in the manifest, and wherein resolving the @patchURL comprises determining to add the remote EventStream element to the updated remote element while the client device maintains a connection to the first content server;

manipulating, while the other media content is streamed, to the client device and from the second content server, the updated remote element after the default remote element is resolved, to the resolved remote element, based on a signaling by a document, of the event stream update, stored in a remote location; and streaming, to the client device, at least one of the media content from the first content server and the other media content from the second content server based on manipulating the updated remote element, wherein said signaling signals retrieving of a plurality of instructions, after the remote element is resolved, and applying the retrieved instructions to the resolved remote element.

\* \* \* \* \*